W. K. HOWE.
SIGNAL.
APPLICATION FILED FEB. 18, 1911.
1,150,005.
Patented Aug. 10, 1915.
5 SHEETS—SHEET 3.
Fig. III.
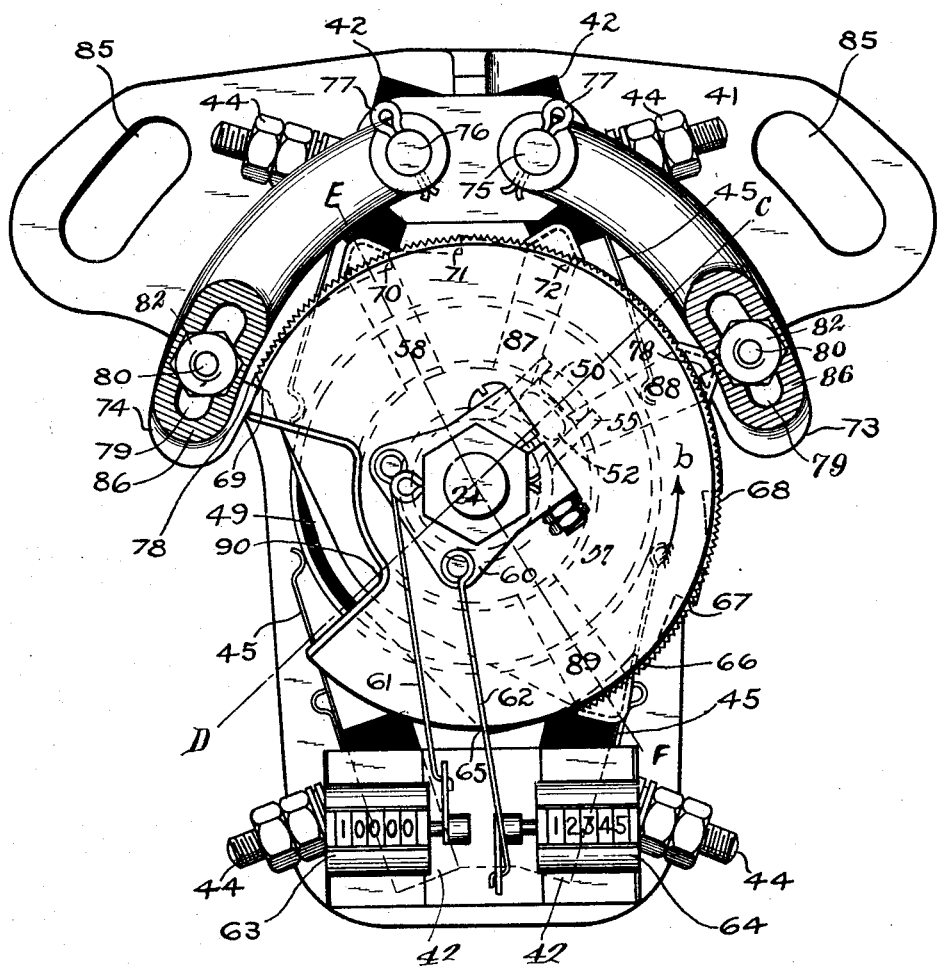
WITNESSES:
George T. Whitney
James E. Stephenson
Winthrop K. Howe
INVENTOR.
BY Lyman E. Dodge
ATTORNEY.

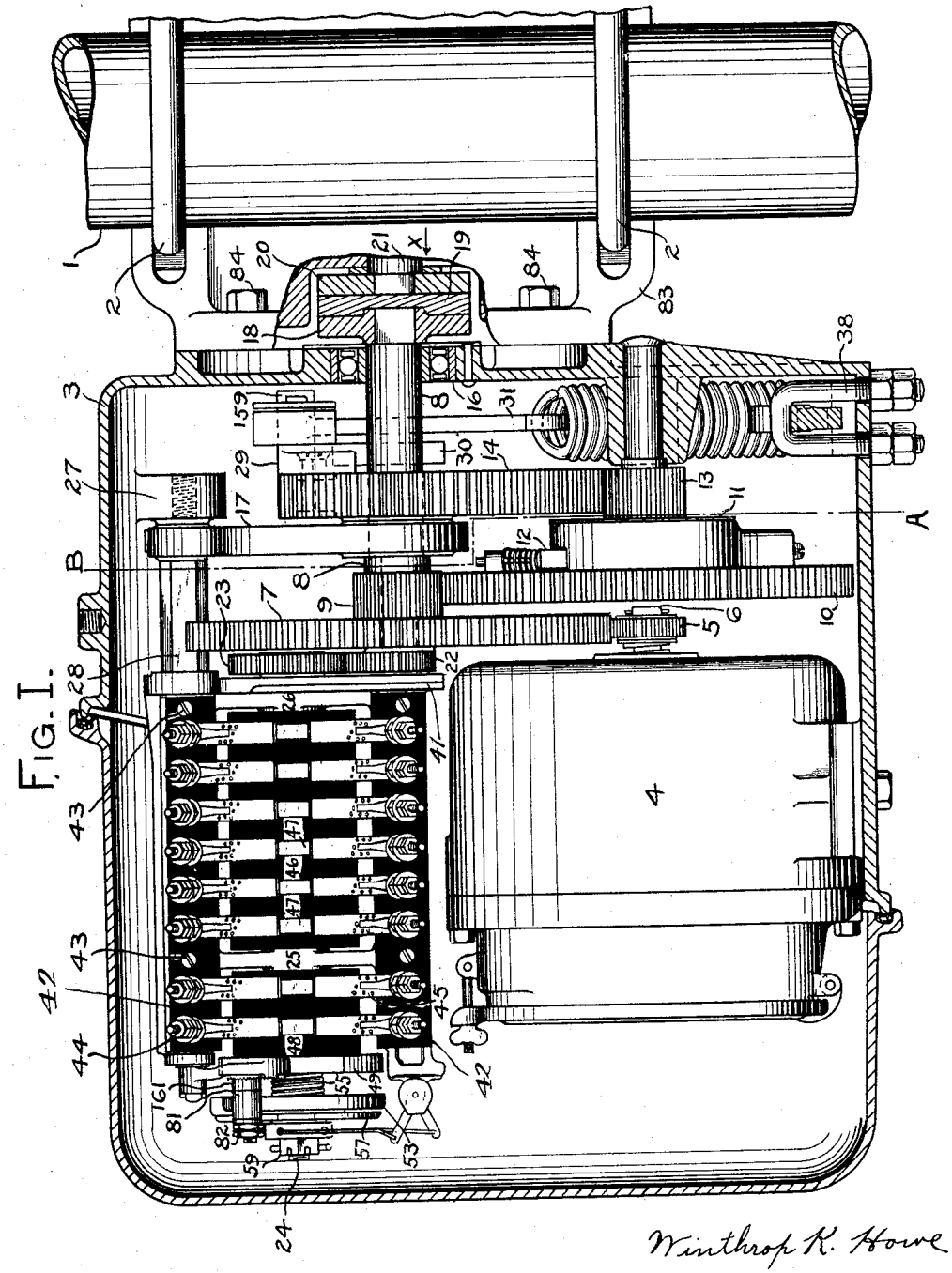

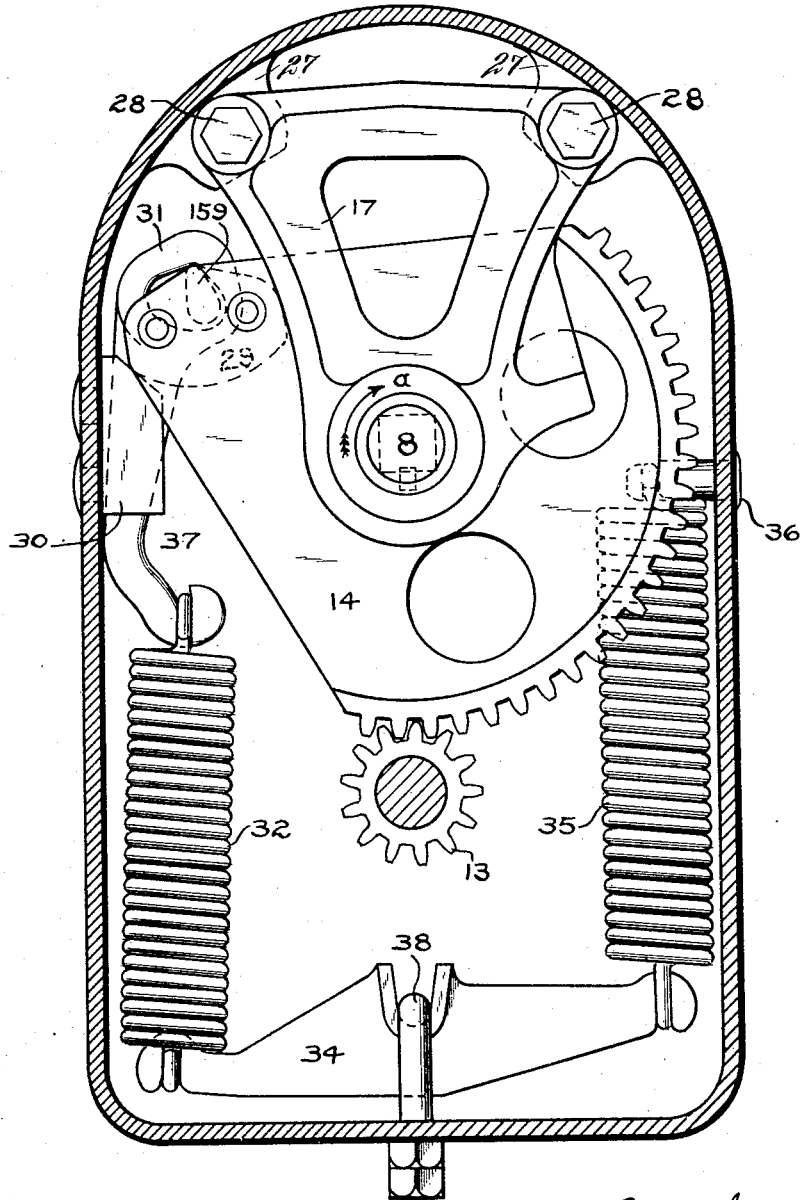

W. K. HOWE.
SIGNAL.
APPLICATION FILED FEB. 18, 1911.
1,150,005.
Patented Aug. 10, 1915.
5 SHEETS—SHEET 4.
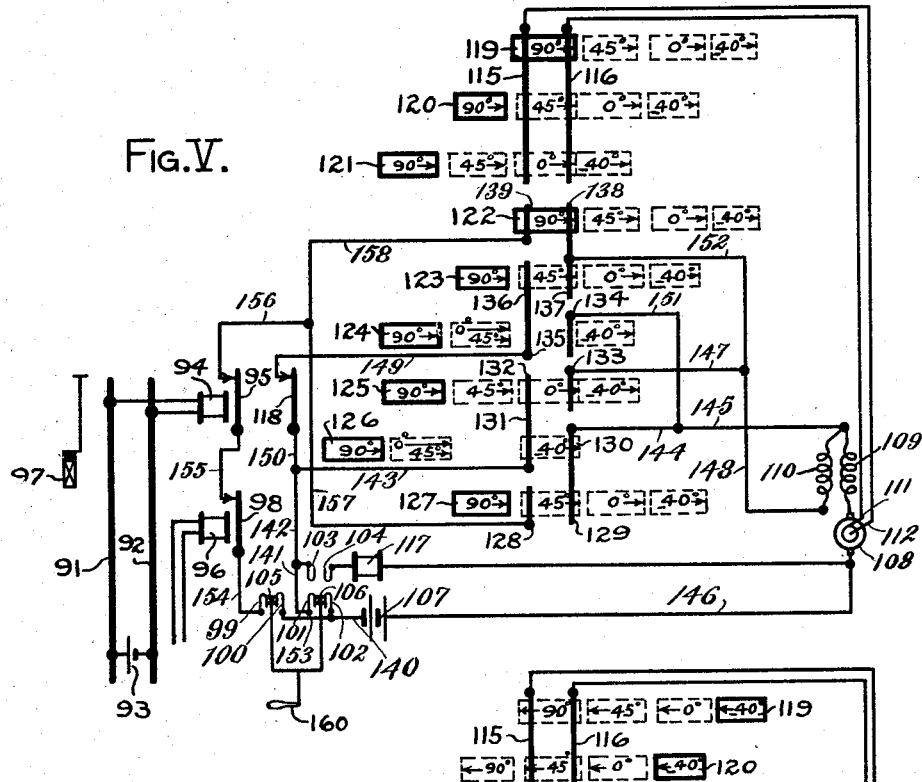
Fig. V.
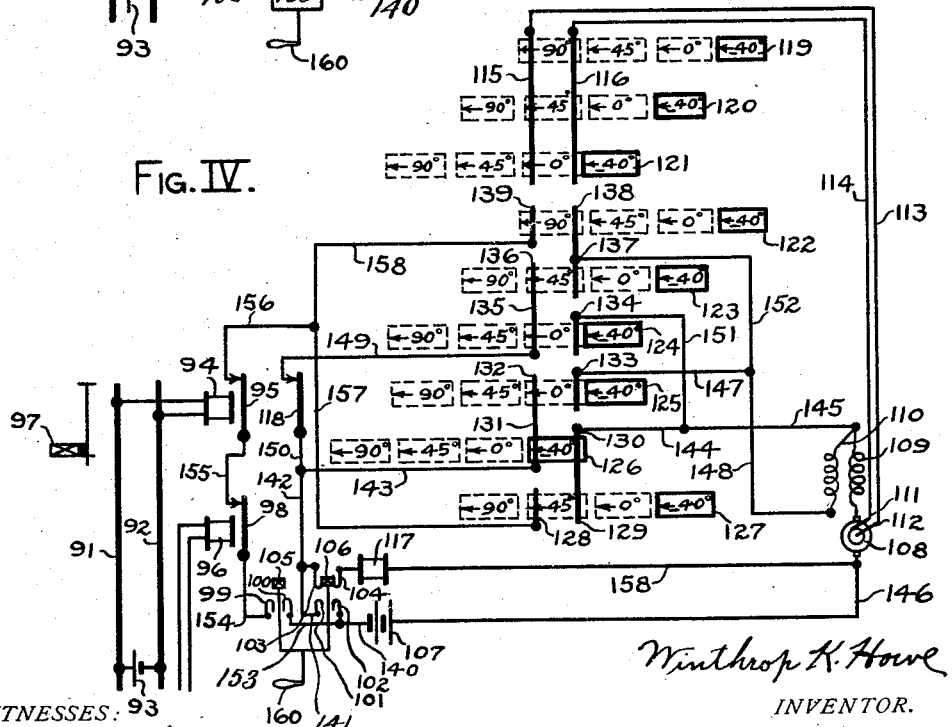
Fig. IV.
WITNESSES:
George T. Whitney
James E. Stephenson
Winthrop K. Howe
INVENTOR.
BY Lyman E. Dodge
ATTORNEY.
COLUMBIA PLANOGRAPH CO., WASHINGTON, D. C.

W. K. HOWE.
SIGNAL.
APPLICATION FILED FEB. 18, 1911.
1,150,005.
Patented Aug. 10, 1915.
5 SHEETS—SHEET 5.
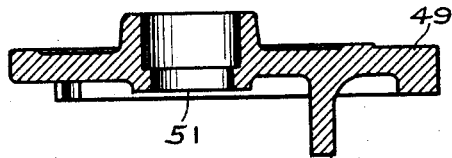
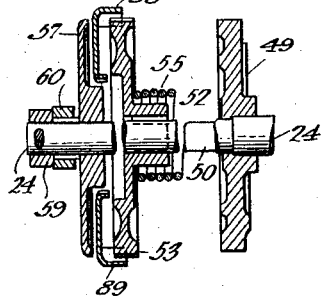
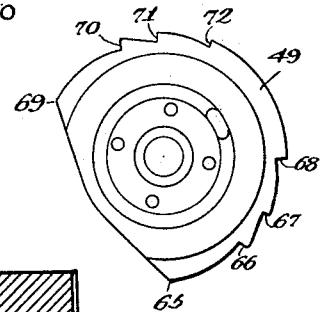
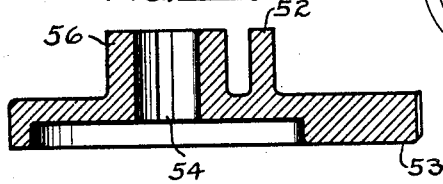
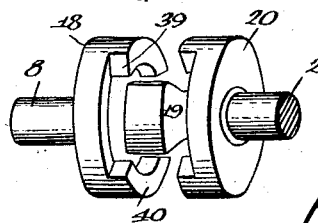
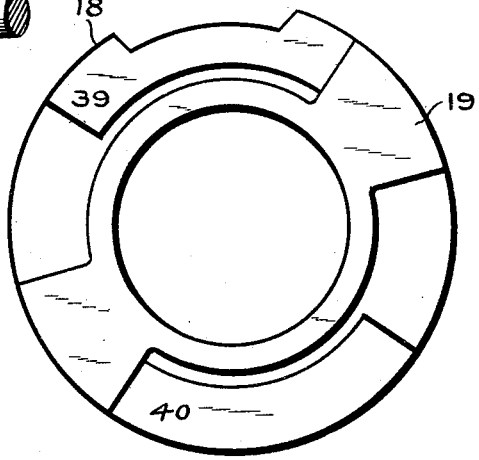
WITNESSES:
George T. Whitney
James E. Stephenson
Winthrop K. Howe
INVENTOR.
BY Lyman E. Dodge
ATTORNEY.

UNITED STATES PATENT OFFICE.

WINTHROP K. HOWE, OF ROCHESTER, NEW YORK, ASSIGNOR TO GENERAL RAILWAY SIGNAL COMPANY, OF GATES, NEW YORK, A CORPORATION OF NEW YORK.

SIGNAL.

1,150,005.     Specification of Letters Patent.     Patented Aug. 10, 1915.

Application filed February 18, 1911. Serial No. 609,417.

*To all whom it may concern:*

Be it known that I, WINTHROP K. HOWE, a citizen of the United States, and resident of the city of Rochester, in the county of Monroe and State of New York, have invented a new and useful Signal, of which the following is a full, clear, concise, and exact description of the physical embodiment which I have selected to illustrate the principle of my invention, reference being had to the accompanying drawings, forming a part of the specification.

This invention relates to a signal and more particularly to the construction and arrangement of a semaphore actuating mechanism which will indicate to an operator at a predetermined point, that the mechanism together with the semaphore, has returned to normal position.

The primary object of this invention is the construction and arrangement of a device of the character above described such that a return indication of the danger position of a semaphore may be obtained from a semaphore actuating mechanism, which allows the semaphore to return to normal position upon the passing of a train, without the use of complicated interlocking lever attachments heretofore used.

This invention consists primarily in a means for producing a backward rotation of the semaphore actuating motor after the semaphore has returned to the normal or danger position; the said means being further so designed that it will but slightly impede the motor when the motor is moving the semaphore to the full clear or 90° position and being further so designed that it will not strongly tend to rotate the semaphore motor backward until just before or at the zero or danger position of the semaphore.

This invention will be more fully described hereinafter with reference to the form thereof herein illustrated and which I have selected as an example for the purpose of explaining the principle involved, it being understood that the invention may be embodied in various forms and arrangements of apparatus.

In the accompanying drawings like reference characters denote corresponding parts throughout the several views in which:

Figure 1 is a side elevation of the semaphore actuating mechanism and casing of my invention with the inclosing casing in section and certain parts broken away to more clearly show the construction. Fig. 2 is a cross-sectional view on the line A—B, of Fig. 1. Fig. 3 is an end elevation of a circuit breaker employed with my invention. Figs. 4 and 5 are diagrammatic representations of the circuit breaker and the circuits controlled thereby which may be used in my invention. Figs. 6 and 7 are cross sectional details of the circuit breaker shown by Fig. 3 on the line C—D of Fig. 3. Fig. 8 is a detail view of part of a coupling used in carrying out my invention looking in the direction of arrow X Fig. 1. Fig. 9 is a view of a detail. Fig. 10 is a cross sectional view on the line E—F of Fig. 3, with some of the parts separated to more clearly show the construction. Fig. 11 is a perspective view of a coupling device used in applicant's invention, the parts being separated to more clearly show the construction.

*Construction.*—1, designates a mast to which by means of the U bolts 2, the support 83 is clamped, which in turn by means of bolts 84 supports the casing 3, inclosing the semaphore mechanism; 4 designates the electric motor for actuating the semaphore; 5 designates a pinion frictionally mounted upon the shaft 6 of the armature of the motor and which engages the gear 7, revolubly mounted upon a reduced portion of the shaft 8 and which has rigidly attached thereto the pinion 9, which meshes with the gear wheel 10, revolubly mounted upon a drum 11, having ratchet teeth formed in its periphery so that the pawl 12 carried by the wheel 10 may be engaged therewith and cause the drum to revolve carrying with it the pinion 13, the ratchet connection allowing the motor to continue revolving after the mechanism on the semaphore side of the ratchet has been stopped, when the motor is revolved backwardly by the springs 32 and 35 or the semaphore; 14 designates a sector having teeth on its periphery which engage with the teeth on the pinion 13; 8 is the shaft to which the sector 14 is rigidly attached which shaft is journaled in the ball bearing 16 and a bearing formed in the hanger 17 and carries on its outer end the coupling member 18, which by means of the driver 19 transmits motion to a second coupling member 20, which is fastened rigidly to the shaft 21 on the outer end of which the ordinary semaphore is fastened rigidly.

Fastened rigidly to the inner end of the shaft 8 so that it will revolve therewith is the small sector 22; 23 designates another sector meshing with the sector 22 and fastened rigidly to the inner end of the circuit breaker shaft 24, the said shaft being carried in bearings formed in the members 25 and 26 which form part of the frame work carrying the circuit breaker parts. The framework is attached to the downwardly extending casing lugs 27 by means of spacing studs 28, the spacing studs passing through slotted holes 85 best shown in Fig. 3, in the end portion 41 of the frame of the circuit breaker, so that it may be adjusted. Attached to sector 14 is a block 29 carrying a knife edge 159, see Fig. 2, which has bearing there-against a link 31, the other end of the link being connected to the end of a spring 32, which spring is connected at its other end to a lever 34, said lever having connected to its other end the spring 35, said spring fastened at one end to the rigid stud 36. With the sector in the position shown in Fig. 2, the block 29 bears against the stop 30 and the semaphore is so connected to the shaft 8 through the coupling member that at such time the semaphore will be in the zero or danger position, the knife edge being further so placed upon the sector 14, that when the sector 14 has moved through an angular distance of about 40° the link 31 will bear against the shaft 8 at the bent portion of the link 37, the springs at that time being fully distended a further motion of the upper end of the link 31 causing no further elongation of the spring 32 and spring 35. When tension is exerted upon spring 32 the lever 34 is moved about its pivot 38 which consists of a U bolt fastened at the bottom of the case, consequently the right hand end of the lever 34 as viewed in Fig. 2 is depressed which movement is resisted by the tension of spring 35.

The coupling members 18 and 20 which are most clearly shown in Figs. 8 and 11 are formed exactly alike and have each two upstanding lugs as 39 and 40, Figs. 8 and 11, the lugs on both members 18 and 20 being of the same length, the lugs in width, that is measured at right angles to the plane of Fig. 8 being half the thickness of driver 19 and the ends of the driver 19 being bounded by an arc of half the angular value of the arc between either end of lug 40 and the adjacent ends of lug 39, the construction thus allowing one, 18, of the coupling members to move independently of the other, 20, and in the construction shown a free movement of 40° is allowed driver 19 as regards coupling member 18 which, of course, allows a free movement of 80° between coupling members 18 and 20. The coupling members 18 and 20, and the driver 19, are, however, so assembled that when a semaphore is attached to shaft 21, and is in the danger position a free movement of only 40° exists between members 18 and 20.

The circuit breaker used for making and breaking the numerous circuits needed to govern this device has a frame portion 41 which has fastened thereto the insulating blocks 42 by means of screws 43; 44 designates binding posts which not only rigidly hold the flexible springs 45 in place upon the insulating blocks 42, but also furnish a means for fastening the conductors conveying current in the different circuits. The circuit breaker shaft 24 has rigidly attached thereto a drum 46 constructed of insulating material and having grooves 47 in which are fastened metallic strips represented by small full-line rectangles in Figs. 4 and 5 the same being placed in the grooves 47 in such a relation to the springs 45 as will accomplish the result desired as will more fully hereinafter appear. On the outer end of the shaft 24 is rotatably mounted a drum 48 to the outer end of which is fastened the plate 49, which plate bears upon its outer face, the outstanding projection 50, as best shown in Fig. 6, which is at such a distance from the center of the hole 51 through which the shaft 24 passes that it may overlap the projection 52 best shown in Fig. 7, which is on the back of a plate 53 fastened to the shaft 24 by a key fitting in the keyway 54, so that said plate 53, must revolve with the shaft. A spring 55 coiled about the hub 56 of plate 53 has its two ends bent outwardly, best shown in Fig. 3 so that they press upon the outer edges of the two lugs 50 and 52 and keep the same normally in alinement. The plate 53 has a cavity in its outer face into which a hub upon a clamp plate 57 enters in such a manner that the fingers 58, 87, 88 and 89 best shown in Fig. 3 and having right angled extensions on their inner ends may fit therebetween, a castle nut 59 screwing onto the end of shaft 24, holding the plate 57 in place. Clamped to the reduced inner end of the nut 59, is a plate member 60 having attached thereto the rods 61 and 62 to connect with the counters 63 and 64 respectively.

The plate 49 as best shown in Fig. 3 has its periphery formed into a series of stops 65, 66, 67, 68, 69, 70, 71 and 72, the stops 65 to 68 inclusive being engaged by the latch 73 and the stops 69 to 72 inclusive being engaged by the latch 74, which latch members are pivotally mounted upon the studs 75 and 76, which studs are fastened to the frame member 41 and which allow the latches to turn freely thereon but which latches cannot move longitudinally thereon because of the cotter pins 77. The latch members 73 and 74 have each a shoulder 78 and a slot 79 in their lower end through which slot a bolt 80 passes holding in place a sleeve 81 thereon by means of the nuts 82 on the outer end of the bolt, there being a serrated sleeve 161, spacing sleeve 81 from the latch, the serrations on the serrated sleeve 161 engaging the serrations 86 upon the face of the latch so as to maintain the adjustment of parts. The fingers 58, 87, 88 and 89 engage serrations on the periphery of plate 53 and are clamped thereto by means of plate 57, which has a cut out portion 90 of such a size that when placed opposite a finger, the finger can be removed or adjusted about the face of plate 53.

Figs. 4 and 5 represent diagrammatically a section of track and the circuits which may be used to operate my semaphore operating mechanism. 91 and 92 designate the two rails of a railway track; 93 designates a battery for creating a difference of potential between the rails; 94 designates a track relay which causes armature 95 to be in its upper position when no train is on the track; 96 designates a relay, in practice called the 90° control relay, and which is governed by the position of the signal next ahead of signal 97 and which is intended to prevent the placing of signal 97 in its full clear or 90° position unless the next signal ahead is either in the 45° position or 90° position and does so by allowing armature 98 to fall if the signal ahead is not either in the 45° or 90° position; 99, 100, 101, 102, 103 and 104 designate contact springs, 99 and 100 being designed to be connected by means of a connecting block 105 when a lever 160 in an interlocking machine to which it is connected is in the reverse position and at the same time springs 99 and 100 are connected by block 105 the springs 101 and 102 would be connected by block 106, which block 106 in the normal position of the lever would connect springs 103 and 104; 107 designates a battery for furnishing current to operate the motor 4, which in Figs. 4 and 5 is represented by an armature 108 and normal operating field coil 109 and a holding field coil 110, and which has connected to windings on the armature by means of brushes 111 and 112 the two wires 113 and 114 leading to three sets of the circuit breaker springs 45 which are represented in Figs. 4 and 5 by the heavy black lines 115 and 116; 117 designates the well known indication magnet as used on an electric interlocking machine and as is well known is designed when operated to release a certain lever of the machine so that it may be moved to its final position; 118 designates an armature controlled by relay coil 94. The small rectangles 119, 120, 121, 122, 123, 125, represent the small metallic strips placed in the grooves 47, in the drum 46 of the circuit breaker and 124, 126 and 127 the same kind of strips located in grooves in drum 48 and are designed to at times connect an upper and a lower spring 45 with each other; the said springs 45 being represented on Figs. 4 and 5 by heavy black lines and numbered 128, 129, 130, 131, 132, 133, 134, 135, 136, 137, 138 and 139. In Fig. 4, the full line positions of the small rectangles are the positions of the metallic strips when the signal is at the zero position and the mechanism is at what might be called the —40° position. In Fig. 5 the full line rectangles represent the positions of the metallic strips when the signal is at the 90° position and in both figures the dotted line rectangles represent the positions of the metallic strips during the course of movement of the signal and mechanism, the indicated degrees referring to the position of the semaphore.

*Operation.*—When no train is on the rails 91 and 92 and the signal ahead of signal 97 is in either the 45° or the 90° position, relays 94 and 96 will be energized, and if at that time the lever in the interlocking machine controlling signal 97 were reversed the connecting blocks 105 and 106 would connect the springs 99 and 100 and 101 and 102 as shown in Fig. 5, which would allow current from the positive side of the battery 107 to flow by means of wire 140, spring 102, connecting block 106, spring 101, wire 141, wire 142, wire 143 to spring 131, metallic strip 126, spring 130, wire 144, wire 145, operating coil 109, armature 108, wire 146 to the negative terminal of battery 107. The current in such path causing the armature of the motor to rotate and through pinion 5, gear wheel 7, pinion 9, gear wheel 10, pawl 12, drum 11 and pinion 13 would cause sector 14 to rotate with the shaft 8 in the direction of the arrow *a* shown in Fig. 2 and as the knife edge bearing 159 is rigidly attached to said sector the link 31 would be moved upwardly and to the right as viewed in Fig. 2 and would cause the springs 32 and 35 to be constantly distended until bend 37 in link 31 contacted with shaft 8 which would be after sector 14 had rotated through about 40° during which movement although sector 14 is rigidly attached to shaft 8 and coupling 18 as rigidly attached to shaft 8 the semaphore attached to shaft 21 would not be moved, as the free movement between coupling member 18, driver 19 and coupling 20 would not be exceeded. During the above described action, sector 22 on the end of shaft 8 would by engagement with sector 23 on the end of circuit breaker shaft 24 rotate said shaft 24 in a direction counter clock-wise, that is, in the direction of arrow *b*. Fig. 3, and as plate 53 is connected to shaft 24 it would also move counter clockwise carrying with it finger 58 so that at the time sector 14 had rotated 40°, plate finger 58 would contact with sleeve 81 rigidly attached to latch 74, force the same outwardly and thus cause latch shoulder 78 to disengage shoulder 69 on the latch plate 49 and during which time lug 52 would also rotate in the direction of the arrow b out of alinement with lug 50 causing a tension to be exerted upon spring 55 which tension on spring 55 would cause a tension on lug 50 of latch plate 49, but as latch plate 49 is held from movement by shoulder 78 contacting with shoulder 69 no movement of plate 49 could take place but when finger 58 contacts with sleeve 81, latch 74 being forced outwardly allows plate shoulder 69 to pass by latch shoulder 78 and thus allows the spring 55 to rotate plate 49 and drum 48 in the direction of the arrow b, until the plate is stopped and held by its shoulder 70 engaging latch shoulder 78. This drum movement causes metallic strip 126 to break contact with springs 130 and 131 with a snap and by the time metallic strip 126 has snapped from contact with springs 130 and 131 contact 125 has been moved into contact with springs 132 and 133 as it is on the drum 46 which moves in unison with the semaphore actuating mechanism so that a holding circuit would be formed as follows: positive side of battery 107, wire 140, spring 102, block 106, spring 101, wires 141, 142 and 143, spring 131, spring 132, strip 125, spring 133, wires 147 and 148, holding coil 110, operating coil 109, armature 108 and wire 146 to the negative terminal of the battery, thus holding the mechanism in the moved position as sufficient current passes through the last above traced path to sufficiently energize the motor to prevent the backward rotation of the semaphore actuating mechanism, and at the same time that strip 125 made contact with springs 132 and 133, strip 121 on drum 46 made contact with springs 115 and 116, so that the wires 113 and 114 were connected, thus short circuiting the coils on the armature connected to brushes 111 and 112 and snubbing the motor so as to reduce its tendency to over-run. At the same time that strip 126 snapped from contact with springs 130 and 131, strip 124 snapped into contact with springs 134 and 135 as strip 124 is fastened to the drum 48.

If armature 118 was not in contact with wire 149 at the end of the movement described, the mechanism would remain in the moved position but if armature 118 contacted with wire 149 the following complete circuit would be made, positive terminal of battery 107, wire 140, spring 102, block 106, spring 101, wires 141, 142 and 150, armature 118, wire 149, spring 135, strip 124, spring 134, wire 151, wire 145, operating field 109, armature 108 and wire 146 to the negative terminal of the battery. The current flowing in the last above traced path would cause a further rotation of the motor beyond 40°, and through the train of gearing heretofore described would cause a further rotation of sector 14 in the direction of the arrow a, but such rotation of sector 14 would not cause a further extension of springs 32 and 35 for the link 31 would revolve about shaft 8 as a fulcrum by virtue of the bend 37 contacting with shaft 8 but as the free movement of the coupling members between shaft 8 and shaft 21 to which the semaphore is attached has been exhausted the semaphore will begin to move toward the 45° position at which point the momentum of the motor will be checked by the snubbing device as strip 120 will at that time be in engagement with springs 115 and 116 being moved to such position by the rotation of drum 46, at the same time strip 123 will connect springs 136 and 137 so that a circuit will be formed as follows: positive side of battery 107, wire 140, spring 102, block 106, spring 101, wires 141, 142 and 150, armature 118, wire 149, spring 135, spring 136, strip 123, spring 137, wires 152 and 148, holding coil 110, operating coil 109, armature 108, wire 146 to the negative terminal of the battery 107. The current flowing in the last above traced path would hold the semaphore in its now reached 45° position if armature 98 was not in its upper position so that the semaphore could continue to the 90° position. In moving the blade from the zero position to the 45° position the mechanism also through the shaft 24 rotated the plate 53 and finger 87 toward latch 74 and would at the moment the semaphore reached the 45° position cause finger 87 to contact with sleeve 81 and throw the latch out of engagement with the shoulder 70 whereupon plate 49 together with drum 48 would be rotated in the direction of the arrow b in Fig. 3 snapping strip 124 out of engagement with springs 134 and 135 and snapping strip 127 into engagement with springs 128 and 129 the latch plate 49 being caught and held in position by plate shoulder 72 coming in contact with shoulder 78 on the latch 74. If at the time strip 127 is brought into contact with springs 128 and 129, armatures 98 and 95 are in their upper position and the lever to which blocks 105 and 106 are connected is in the reversed position shown in Fig. 5, current will flow through the following path: positive terminal of battery 107, wire 140, wire 153, spring 100, block 105, spring 99, wire 154, armature 98, wire 155, armature 95, wire 156, wire 157, spring 128, strip 127, spring 129, spring 130, and wires 144 and 145, operating coil 109, armature 108, and wire 146 to the negative terminal of the battery. The current in the last above traced path would cause the motor to operate and move the semaphore to the full 90° position at which point strip 119 would contact with springs 115 and 116 snubbing the motor and at the same time strip 122 would contact with springs 138 and 139 closing the following path: positive terminal of battery 107, wire 140, wire 153, spring 100, block 105, spring 99, wire 154, armature 98, wire 155, armature 95, wires 156, 158, spring 139, strip 122, spring 138, spring 137, wires 152 and 148, holding coil 110, operating coil 109, armature 108, and wire 146 to the negative terminal of the battery, the current in the above traced path holding the semaphore arm in the full clear or 90° position and at the moment it reaches such position, finger 88 will contact with sleeve 81, release the latch plate 49 from engagement with the latch 74 and cause the contact strip 127 borne by drum 48 to be snapped from engagement with springs 128 and 129 thus breaking the operating circuit for the motor. After the motor has thus moved the signal to the full clear or 90° position the only two contact strips in engagement with springs would be 122 and 119 as shown by Fig. 5, and plate shoulder 65 would be in engagement with shoulder 78, of the latch 73. If a two position upper quadrant signal moving through 60° of arc were used then shoulder 71 would hold on latch 74 until the signal had assumed the clear position. In such case the position of finger 58 would of course be changed accordingly. If a three position lower quadrant signal had been attached to shaft 21, and the direction of rotation of the motor 4 reversed, then shoulder 68 would be used as 72 is now. If a two position lower quadrant signal were used then shoulder 67 would serve as 71 does with a two position upper quadrant signal.

With all the parts as shown in Fig. 5, by full lines, if a train should enter upon a block protected by signal 97, relay armature 95 and 118 would drop and by the dropping of armature 95 the holding circuit holding the semaphore in the full 90° position would be broken and the semaphore would return by gravity to the 45° position carrying with it the drum 46, and also shaft 24 which causes plate 53 to revolve in a direction contrary to arrow $b$ as shown in Fig. 3, and when the semaphore has reached the 45° position finger 89 will contact with sleeve 81 fastened to latch 73 and force said latch out of engagement with shoulder 65 on which it was caught by the semaphore going to the full 90° position and would thereby cause strip 127 to snap into engagement with springs 128 and 129. At the same time that strip 127 snapped into contact with springs 128 and 129, strip 120 would be in contact with springs 115 and 116 so that the motor would act as a braking generator to prevent the arm moving too rapidly at the moment it reached the 45° position, by a generation of current depending on residual magnetism. At the same time that strip 120 contacted springs 115 and 116 strip 123 contacted with springs 136 and 137 and would, if armature 98 had alone been dropped when the signal was in the full 90° or clear position have held the semaphore arm at the 45° position. I have assumed that armatures 95 and 118 were open, therefore, the semaphore will continue to move toward the zero position and would when it reached that position cause the motor to be snubbed by strip 121, contacting with springs 115 and 116 and would at the same time cause strip 125 to contact with springs 132 and 133, which would establish a holding circuit heretofore described to hold the semaphore actuating mechanism in the zero position by current in the following path: positive terminal of battery 107, wire 140, spring 102, block 106, spring 101, wires 141, 142, and 143, spring 131, spring 132, strip 125, spring 133, wires 147, and 148, holding coil 110, operating coil 109, armature 108 and wire 146 to the negative terminal of the battery. The last above traced path would exist as long as the lever remained in its reversed position with blocks 105 and 106 in the position shown in Fig. 5 and it will be noticed that at this time, although the semaphore arm is at the zero position the mechanism has not returned to its normal condition for the springs 32 and 35 are still distended, the sector 14 is at a position 40° from its initial position but it will also be observed that at this time the springs are exerting a strong tension on link 31 tending to return the mechanism to the normal position but such tendency is resisted by the holding circuit last above traced, so that if the holding circuit is broken by placing the lever 160, in the normal indication position shown in Fig. 4, the springs 32 and 35 will force the mechanism to the normal position causing the shaft 24 to further revolve in an opposite direction to the arrow $b$ shown in Fig. 3 and would cause plate 53 to further revolve and cause finger 88 to contact with sleeve 81 on latch 73, force the latch from engagement with shoulder 66, with which it engaged when the semaphore arm reached the 45° position and thus cause drum 48 carried by plate 49 to snap the strip 124 past springs 134 and 135 and cause strip 126 to snap into contact with springs 130 and 131 all of which is caused to happen by so adjusting finger 88 that it will release latch 73 a few degrees before the mechanism reaches its normal position, the consequence of which is the motor by its backward rotation caused by the 40° or thereabout backward rotation of the mechanism generates a current which at the moment strip 126 snaps into contact with springs 130, and 131, has a complete path for it as follows: block 106, spring 103, wires 142 and 143, spring 131, strip 126, spring 130, wires 144 and 145, operating coil 109, armature 108, and wire 158, indication magnet 117 to spring 104 and and thus to block 106, the current in said path allows the lever to be moved from its indication position to its full normal position thus releasing as is well known the locks of conflicting routes. It will thus be seen that by means of the mechanism herein described the semaphore arm may be operated by means of an electric motor to either the 45° or 90° position depending upon track conditions and that after having been so moved by a change in track conditions the signal will be caused automatically to return to either 45° or the zero position and that after it has returned to the zero position by the operation of means not including a movement of an interlocking lever by which the signal is moved to the clear position, a dynamic indication of the zero position of the blade can be obtained by then returning the lever controlling the signal to the indication position thereby breaking the holding circuit, which allows the mechanism at the signal to generate a dynamic current which on or about the time the mechanism for so doing has returned to normal position completes a circuit which allows that current to flow through an indication magnet and in the well known manner release a latch so that the lever may be returned to the full normal position.

Heretofore where signals such as described and which are ordinarily called semi-automatic signals have been used, it has been necessary to employ means for storing up the indication at the lever when the signal was returned to the normal position by a change in track conditions but by this invention complicated mechanisms of this character are entirely done away with, and a simple, reliable and dependable device has been constructed for accomplishing the object set forth. It will also be readily understood that if the interlocking lever is placed in normal indication position when the semaphore is at the 90° or full clear position, the semaphore will fall to the zero or danger position and that the mechanism will continue rotating backward to give the indication until stopped by stop 30; so that an operator can cause signal 97 to move up and down at pleasure irrespective of the action of a train if no train is on rails 91 and 92.

Having particularly described the construction and operation of one physical embodiment of my invention and explained the operation and principle thereof, what I claim as new and desire to protect by Letters Patent is:

1. In an electric interlocker signal, a track circuit section, a train adapted to move over said section, a lever having an operative position and an indication position, circuit closers connected to the lever and moving therewith, springs contacted by the circuit closers in the operative position of the lever and in the indication position of the lever, circuits containing the springs contacted by the circuit closers, a source of current in one of said circuits, a motor in said one circuit moved to operated position by the current from said source when said circuit closers contact said springs in the operative position of said lever, a circuit to hold said motor in operated position formed by the movement of said motor, a semaphore, means connecting the semaphore to said motor, including a lost motion coupling and a shaft, whereby said motor has a motion independent of said semaphore a power storing device connected to said motor, said power storing device consisting of a link and expansion springs connected thereto the springs being expanded during the period of lost motion movement of the motor, a crank on said shaft, said link connected to said crank, a bend in said link a short distance from the end connected to the springs adapted to fulcrum on said shaft at the end of the period of lost motion between the motor and the semaphore to prevent further excessive expansion of the springs, circuit breakers interposed in the circuit to the motor, connections moved in unison with the motor to actuate said circuit breakers, means to delay the movement of certain of said circuit breakers, means acting on said delaying means at times to prevent further delay and allow said delayed circuit breakers to complete their movement with a snap, means governed by the train to break the circuit holding the signal in its operated positions, a second holding circuit for the motor including said circuit breakers which are undelayed, said connections to actuate said other circuit breakers being by the breaking of the first mentioned holding circuit put in operation in a reverse direction and operating to close the second mentioned holding circuit through the motor to hold the connections between the motor and the semaphore in the limit of the free motion between the semaphore and the motor, a movement of said lever from operative to indication position breaking the second mentioned holding circuit for the motor to allow the power storing device to rotate the motor backward and another of the said circuit breakers adapted to make a circuit through the motor just before the end of its backward movement, an indication magnet controlling the said lever actuated by current generated in the motor by said backward rotation.

2. In an electric interlocker signal, a semaphore, a source of current, a motor having an armature actuated by current from said source, means connecting the armature and the semaphore, containing a lost motion device whereby the semaphore may be operated by the actuation of the armature after a predetermined movement of the said connecting means, a power storing device connected to the connecting means adapted to be charged during the period of lost motion, and to drive the motor backwardly when current is cut off, thereby causing the motor to generate a current of electricity, means to utilize the current produced for indicating the position of the semaphore.

3. In an electric semaphore signal, a semaphore, a source of current, a lever having an operating and an indication position, a circuit controller connected to the lever and moving therewith, a motor actuated by current from said source when said lever is in operating position; means for transmitting motion from said motor to said semaphore, a lost motion device interposed in said transmitting means, adapted to allow the transmitting means to move relatively to the semaphore, a power storing device connected to said transmitting means adapted to be charged by the actuation of said motor, during the period of lost motion, means interposed in the motor circuit for interrupting the same and allowing the semaphore to return to normal position by the action of gravity, an indication device and circuit connected to said motor, another circuit controller closed at the normal indication position of said lever, said power storing device acting on the motor to generate a current and release said lever from its normal indicating position so that it may be placed in full normal position.

4. In an electric interlocker signal, a semaphore, means to operate the semaphore, a power storing device, means connecting the power storing device with the means to operate the semaphore whereby the power storing device is charged before the operation of the semaphore, a lever controlled by an indication device, means to utilize the power stored in the power storing device to release the lever.

5. A semaphore, means to operate the semaphore, a circuit controller adapted when closed to set said means in operation, a power storing device which is charged on the initial movement of the means to operate the semaphore, means connecting said power storing device and the means to operate the semaphore, said second mentioned means allowing movement of the semaphore, without considerable charging of the power storing device.

6. In an electric interlocker signal, a semaphore, means to operate the semaphore, means connecting the means to operate the semaphore and the semaphore having lost motion adapted to allow relative movement between the semaphore and the means to operate the semaphore, a crank operated by the means to operate the semaphore, a link connected to said crank, a spring connected to said link, said link having a bend, a fulcrum for said bend, said bend adapted to contact said fulcrum at the end of the free movement of the motor, said bend formed at such a distance from the end of the link connected to the spring as to form an extremely short lever arm.

7. In an electric interlocker signal, a semaphore, a motor to actuate the semaphore, a shaft connected to the motor and to the semaphore, a lost motion coupling interposed in the shaft adapted to allow a predetermined free movement of the motor before the actuation of the semaphore, a crank rigid with the end of the shaft connected to the motor, a link bearing on the crank, the end of the link bearing on the crank being on one side of the horizontal plane including the center line of rotation of the shaft and the other end of the link on the other side of the horizontal plane including the center line of rotation of the shaft, a tension spring, one end of the tension spring connected to the last mentioned end, the other end of the spring operatively connected to a fixed point, a fulcrum point on the link adapted to contact with the shaft after a predetermined movement, the said fulcrum point being located between the longitudinal center of the link and the end connected to the said spring, whereby but slight motion is imparted to the end of the link connected to the spring after said fulcrum engages with the shaft, by the continued rotation of the crank, said link and crank being relatively so placed that a line joining the point of bearing of the crank and link with the point of connection of the spring and link will pass on the side of the shaft opposite the link when said link contacts said shaft, the link and crank being in such relative position to the shaft that the link will contact the shaft at the end of the free movement of the motor.

8. In an electric interlocker signal, a semaphore, means for supporting the semaphore so that it may be oscillated, a motor for oscillating the semaphore, a lost motion device interposed between the semaphore and the motor adapted to allow a predetermined free movement of the motor before the actuation of the semaphore, a lever connected to the motor between the motor and the lost motion device, a link bearing on the lever at the end remote from its pivot, the end of the link bearing on the lever being above the axis of the pivot, the other end of the link being below the axis of the pivot, a power storing device connected to the said other end of the link, a fulcrum point on the link adapted to contact with the said pivot after a predetermined movement has taken place, the said fulcrum point being located between the longitudinal center of the link and the end connected to the power storing device whereby but slight motion is imparted to the end of the link connected to the power storing device after said fulcrum engages with the said pivot by the continued rotation of the lever, said link and lever being relatively so placed that a line joining the point of bearing of the lever and link with the point of connection of the lever and power storing device will pass on the side of the pivot opposite the link when said link contacts said pivot, the link and lever being in such relative position to said pivot that the link will contact the pivot at the end of the free movement of the motor.

9. In an electric interlocker signal, a semaphore, means to operate the semaphore, means connecting the means to operate the semaphore and the semaphore having lost motion adapted to allow relative movement between the semaphore and the means to operate the semaphore, a power storing device, means connecting the power storing device for charging the same with the means to operate the semaphore, said power storing device being largely charged during the period of lost motion, the connections being such that the mechanical advantage between the means to operate the semaphore and the power storing device is thereafter largely increased.

10. In a signal, a semaphore, an electric motor for operating the semaphore, a source of current for operating the motor, a circuit controller for controlling the flow of current from said source to the motor, a lost motion device between the motor and the semaphore, whereby the motor rotates a certain amount before causing an operation of the semaphore, a power storing device connected to the motor charged during the period of lost motion, said power storing device adapted to rotate said motor backwardly after said circuit controller is opened thereby generating an electric current by said motor, an indication magnet for utilizing said current.

11. In a signal, a semaphore having a normal biased position and an operated position, a motor for moving said semaphore from the normal biased position to the operated position, a source of current for operating the motor, a circuit controller for controlling the flow of current from said source to the motor, a lost motion device between the motor and the semaphore whereby the motor may rotate a certain amount before beginning to move the semaphore from the normal biased position to the operated position, a power storing device connected to the motor charged during the period of lost motion, said power storing device adapted to rotate the motor backwardly after said circuit controller is opened and the semaphore thereby liberated has returned to normal biased position thereby generating an electric current by said motor, an indication magnet for utilizing said current.

12. In a signal, a semaphore having a normal biased position and an operated position, a motor for operating the semaphore from the normal biased position to the operated position, said motor connected with the semaphore to rotate backwardly when the semaphore moves from the operated position to the normal bias position, means for causing a generation of current of electricity by said motor at any time after said semaphore moves from the operated position to the biased position by reason of its bias, an indication device for utilizing said current.

13. In a signal, a biased semaphore having a biased position and an operated position, a motor, a train of mechanism connecting the motor and the semaphore, whereby the mechanism always moves backwardly and so rotates the motor backwardly when the semaphore moves from its operated position to its biased position by reason of its bias, a source of current for operating the motor, a circuit controller for controlling the flow of current, means for rotating the motor backwardly after the circuit controller has been opened and the semaphore has returned to its biased position thereby generating a current of electricity, means for utilizing the current for indicating the position of the semaphore.

14. In a signal, a semaphore having a normal biased position and an operated position, a motor connected to the semaphore so as to rotate backwardly therewith, a source of current, connections from the source of current to the motor including circuit controllers, one of said circuit controllers operated manually, means to operate another by the action of a train, when both of said circuit controllers are closed said semaphore being moved and held in the operated position, when said circuit controller controlled by the train is opened said semaphore moving in response to its bias to the biased position, means set in motion by opening said manually controlled circuit controller to thereafter cause said motor to rotate backwardly and generate a current of electricity, means to utilize said current for indicating the position of the semaphore.

15. In a signal, a semaphore having a normal biased position and a plurality of operated positions, a motor connected to the semaphore so as to rotate backwardly therewith, a source of current, connections from the source of current to the motor including a plurality of circuit controllers, one of said circuit controllers operated manually, means to operate the remainder of said circuit controllers by the action of a train, when all of said circuit controllers are closed said semaphore being moved and held in one of its operated positions, when one of said train controlled circuit controllers is closed and said manually controlled circuit controller is closed the semaphore being held in another of said operated positions, when all of said circuit controllers controlled by a train are opened said semaphore moving in response to its bias to the biased position, means set in motion by opening said manually controlled circuit controller to thereafter cause said motor to rotate backwardly and generate a current of electricity, means to utilize said current for indicating the position of the semaphore.

WINTHROP K. HOWE.

Witnesses:
S. A. BENEDICT,
GEORGE T. WHITNEY.

Copies of this patent may be obtained for five cents each, by addressing the "Commissioner of Patents, Washington, D. C."